United States Patent
Hopkins

(10) Patent No.: US 10,250,051 B2
(45) Date of Patent: Apr. 2, 2019

(54) ELECTRONIC DEVICE DOCKING STATION

(71) Applicant: Casey Hopkins, Portland, OR (US)

(72) Inventor: Casey Hopkins, Portland, OR (US)

(*) Notice: Subject to any disclaimer, the term of this patent is extended or adjusted under 35 U.S.C. 154(b) by 63 days.

(21) Appl. No.: 15/653,177

(22) Filed: Jul. 18, 2017

(65) Prior Publication Data
US 2019/0027947 A1 Jan. 24, 2019

(51) Int. Cl.
H02J 7/00 (2006.01)
(52) U.S. Cl.
CPC .................. *H02J 7/0044* (2013.01)
(58) Field of Classification Search
CPC .................................................. H02J 7/0044
USPC ........................................................ 320/115
See application file for complete search history.

(56) References Cited

U.S. PATENT DOCUMENTS

2009/0015198 A1* 1/2009 Brandenburg ........ H02J 7/0044
320/115
2011/0077551 A1* 3/2011 Videbaek ........... A61B 10/0275
600/564
2011/0095724 A1* 4/2011 Byrne .................. G11B 33/122
320/115
2014/0097793 A1* 4/2014 Wurtz .................. H02J 7/0042
320/108

* cited by examiner

*Primary Examiner* — Suresh Memula
(74) *Attorney, Agent, or Firm* — Mohr Intellectual Property Law Solutions, PC

(57) ABSTRACT

An electronic device docking station may include a connector and a base. The connector may include a connector head, a connector plug, and a flexible cable. The connector head may have a neck, a face, a first recess configured to interface with a releasable pivot mechanism, and a pivot surface. The connector plug may extend from the face of the connector head, the plug being configured to connect to an electronic device. The flexible cable may extend from the neck the connector head. The base may include a second recess and a fulcrum surface. The second recess may be configured to interface with the releasable pivot mechanism and thereby releasably secure the connector head to the base. The fulcrum surface may be configured to contact the pivot surface.

16 Claims, 7 Drawing Sheets

ELECTRONIC DEVICE DOCKING STATION

BACKGROUND

The present disclosure relates generally to electronic device docking stations. In particular, docking stations for handheld devices such as smartphones, tablets and PDAs are described.

Known docking stations are not entirely satisfactory for the range of applications in which they are employed. For example, existing docking stations do not work in concert with flexible charging cords, thus users of existing docking stations may not enjoy freedom of movement with their devices while they are charging. In addition, conventional docking stations may require both hands to dock and undock an electronic device. Furthermore existing docking stations generally do not allow the user to swap out connector plugs for different phones.

Thus, there exists a need for docking stations that improve upon and advance the design of known docking stations. Examples of new and useful docking stations relevant to the needs existing in the field are discussed below.

An electronic device docking station may include a connector and a base. The connector may include a connector head, a connector plug, and a flexible cable. The connector head may have a neck, a face, a first recess configured to interface with a releasable pivot mechanism, and a pivot surface. The connector plug may extend from the face of the connector head, the plug being configured to connect to an electronic device. The flexible cable may extend from the neck the connector head. The base may include a second recess and a fulcrum surface. The second recess may be configured to interface with the releasable pivot mechanism and thereby releasably secure the connector head to the base such that the electronic device may be pulled off the connector plug without disengaging the connector head from the base. The fulcrum surface may be configured to contact the pivot surface of the connector head such that an input leverage force may be applied to the electronic device to pivot the connector head in the base and produce an output force suffice to overcome the releasable pivot mechanism.

DETAILED DESCRIPTION

Figure 1:
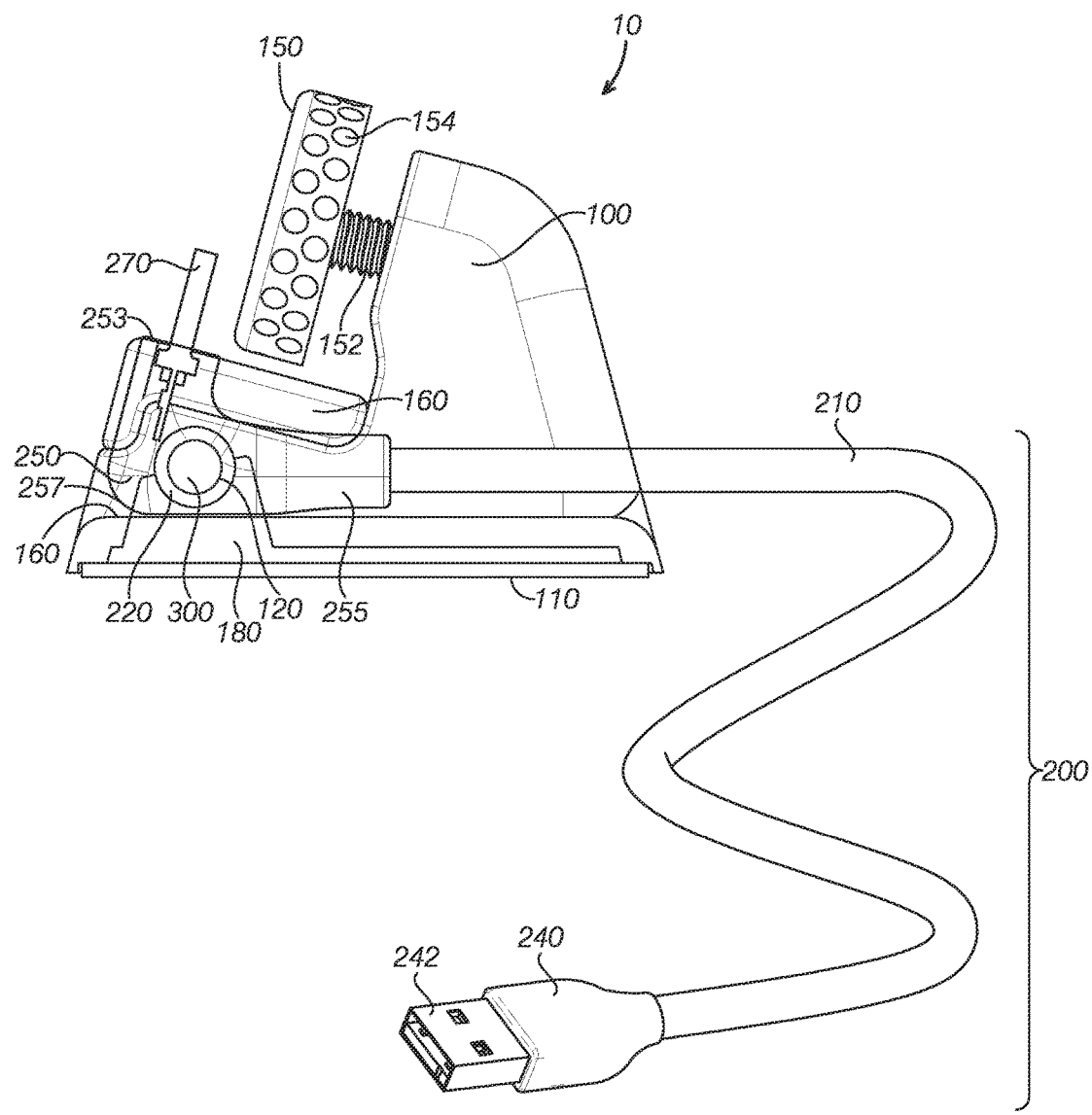
FIG. 1 is a first side elevation view of one embodiment of a docking station, in which the docking station is shown as transparent to illustrate components that would otherwise be obscured.

The disclosed electronic device docking stations will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various electronic device docking stations are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1-6, a first example of an electronic device docking station, docking station 10, will now be described. Docking station 10 functions to hold, display, recharge, and/or connect an electronic device. The reader will appreciate from the figures and description below that docking station 10 addresses shortcomings of conventional docking stations.

For example, docking station 10 includes a connector which can be selectively detached from the docking station, leaving the connector connected to an electronic device. Thus, docking station 10 combines the advantages of charging a device in a docking station, e.g., securely displaying electronic device while charging, with the advantages of charging a device via a flexible cable, e.g., the freedom to move the electronic device around within the radius of the flexible cable. Further, the electronic device may be docked and undocked from the docking station 10 using only one hand. Additionally, because the flexible charging cable can be removed from the base, a user may easily swap out one charge cable for another, for example to accommodate a different electronic device.

Docking station 10 includes a connector 200 and a base 100. The connector comprises a connector head 250, a connector plug 270, and a flexible cable 210. The base comprises a channel 130 and optionally may comprise one or more device supports 150.

As can be seen in FIG. 1, connector head 250 has a neck 255, a face 253, and a first recess 220 configured to interface with a releasable pivot mechanism 300, and a pivot surface 257. A connector plug 270 extends from the face 253 of connector head 250. The connector plug 270 may be configured to connect to an electronic device in order to, for example, charge the electronic device, access information on the electronic, and/or upload information to the electronic device. The connector plug 270 may be any electronic device plug type now know or later developed, including, for example: a USB plug, a mini USB plug, a micro USB plug, or any of the multitude of existing or future developed proprietary plug types, among others.

A flexible cable 210 may extend from the neck 255 of the charging head 250. A first end of the flexible cable may be electrically connected to the connector plug 270 inside connector head 250. A second end of the flexible cable 210 may terminate in terminal plug 242 having a terminal shroud 240. Terminal plug may be USB plug, a mini USB plug, a micro USB plug, a male power plug, or any other type of plug.

The base 100 may comprise one or more device supports 150, fulcrum surface 160, channel 130, lower surface 110, ballast 180 and releasable pivot mechanism 300 retained in first recess 220 and a second recess 120. The device supports 150 function to prop up the rear side of an electronic device so that they device may stand upright at an angle. Support 150 may be an adjustable support to accommodate a variety of digital devices and/or allow the user to adjust the tilt of the electronic device when docked.

As shown, the supports 150 may include threaded connection 152 and dimples 154. The threaded connections 152 may function to allow a user to adjust the supports 150 in and out in order to tailor the tilt of the electronic device as desired by the user. Thus, the supports may comprise two independent threaded members.

Lower surface 110 may comprise a mechanism to firmly secure the base 100 to a surface below the base. In one embodiment the lower surface 110 may include suction cups. In another embodiment, the lower surface 110 may include an adhesive pad. Additionally or alternatively, the base 100 may be weighted with ballast 180 to hold the base 100 down.

Figure 7:
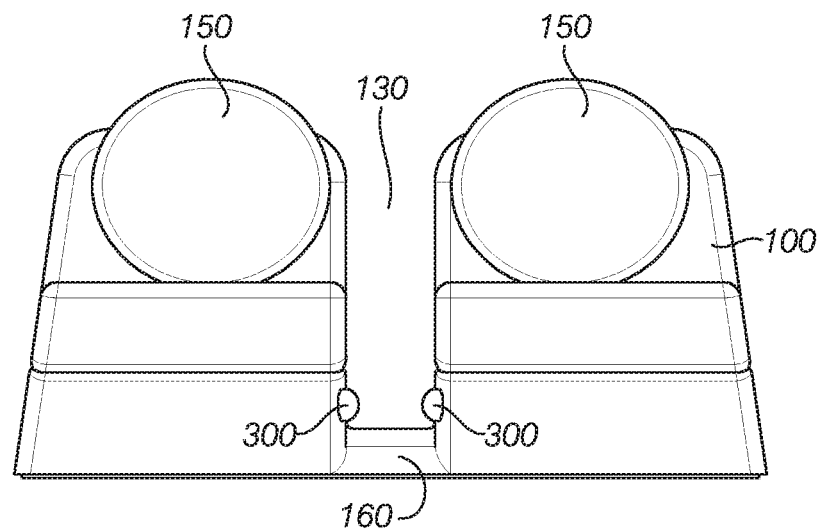
FIG. 7 is an elevation view of the front of the docking station.

As is best shown in FIG. 7, channel 130 is formed in the body of the base 100. Fulcrum surface 160 may form the bottom of channel 130. Detent mechanism 300 may be retained in a sidewall of channel 130. In the illustrated embodiment, base 100 includes two opposing releasable pivot mechanisms, one on each side of channel 130. In other embodiments, the base may include a single releasable pivot mechanism on one side of the channel and static pivot member. The static pivot member may be a formed in the sidewall of channel 130 and may project outward to present a solid hemispherical shape to mate with a corresponding.

As shown in FIG. 1, the connector head 250 may be releasably secured in channel 130 such that the connector plug 270 projects upward and the pivot surface 257 is in close proximity to the fulcrum surface 160. In the illustrated embodiment, the fulcrum surface 160 is a flat surface. In other embodiments, the fulcrum surface may be curved or rockered.

The connector head 250 may be secured in the base via releasable pivot mechanism 300. In one embodiment, releasable pivot mechanism 300 may comprise a detent mechanism. For example the detent mechanism may comprise a spring-loaded ball detent. Specifically, the hemispherical projection of the spring loaded ball of detent mechanism 300 may project into the first recess 220 of the connector head 250, forming a pivot. In the illustrated embodiment, this arrangement is mirrored on both sides of the pivot head 250. In other embodiments, the other side of the pivot head may instead have a static pivot member.

In another embodiment, pivot mechanism may comprise a mating pair of magnets, wherein a first magnet of the pair is disposed in the first recess 220 and a second magnet of the pair is disposed in the second recess 120. In one embodiment, the mating pair of magnets comprises one permanent magnet and one ferromagnetic material. In another embodiment, the mating pair of magnets comprises two permanent magnets.

Figure 3:
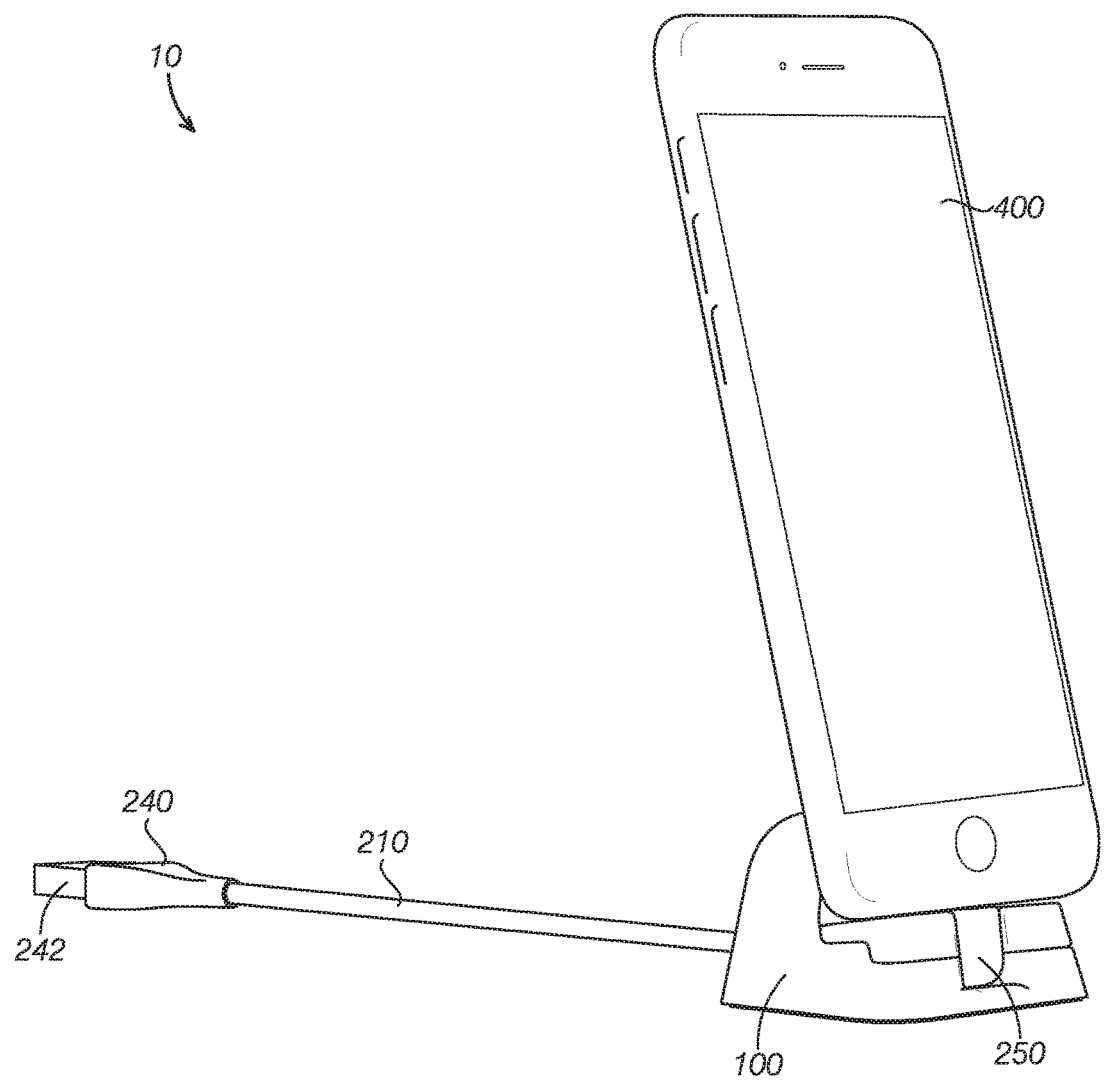
FIG. 3 is a perspective view of the docking station with an electronic device engaged with the docking station.

As shown in FIG. 1, the connector plug 270 may extend from the face 253 at an acute angel relative to the neck of the connector head. Thus, when the back surface of the connector head lays flat on the fulcrum surface of base, the connector plug may extend upward and angle toward the base to impart a tilt-back angle to the electronic device when it is docked in the docking station, for example as shown in FIG. 3.

Figure 2:
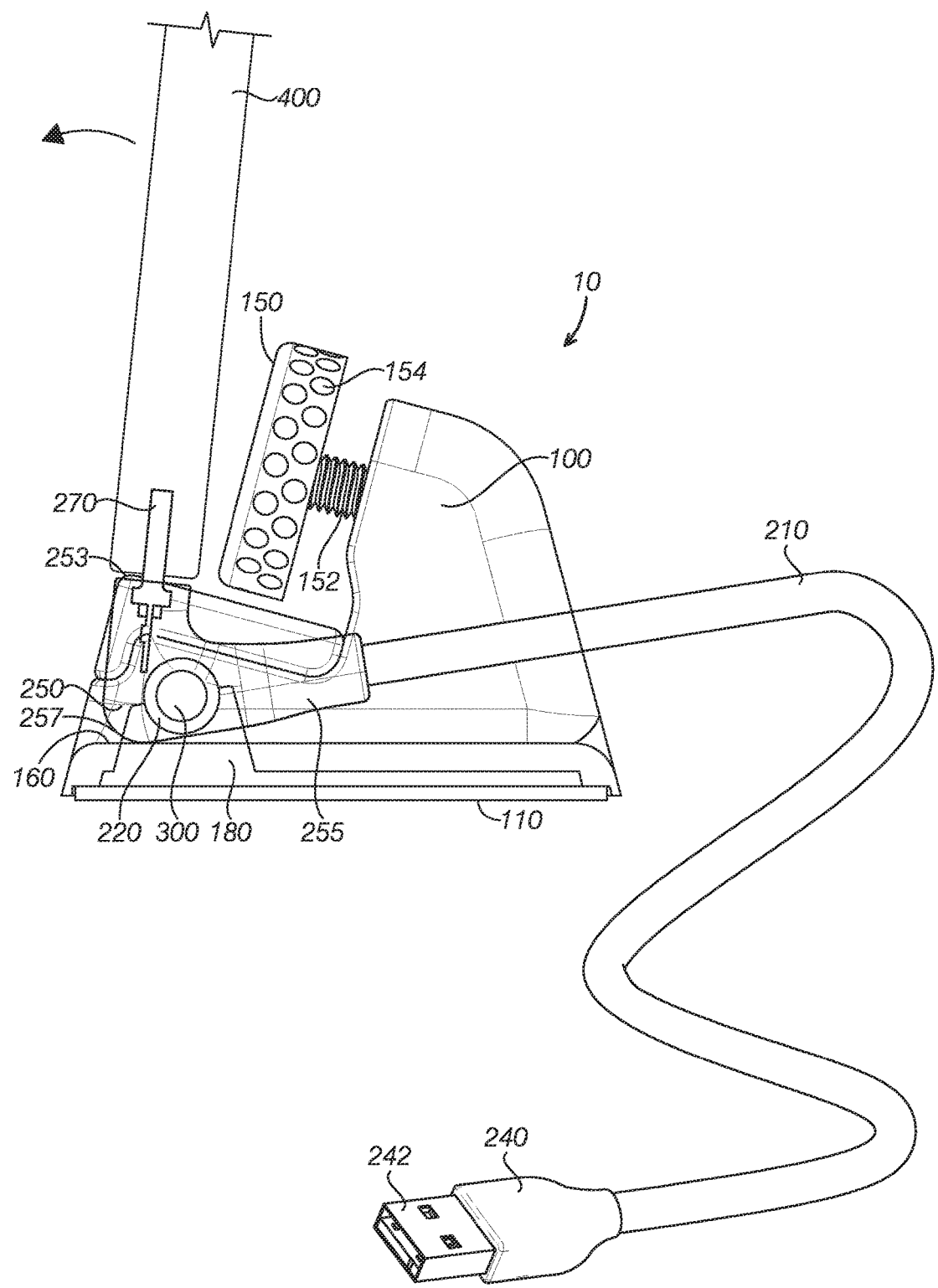
FIG. 2 is a second transparent side elevation view of the docking station of FIG. 1, showing an electronic device being rotated forward in order to disengage the electronic device from the docking station while keeping the electronic device plugged into the charging connector cord.
Figure 4:
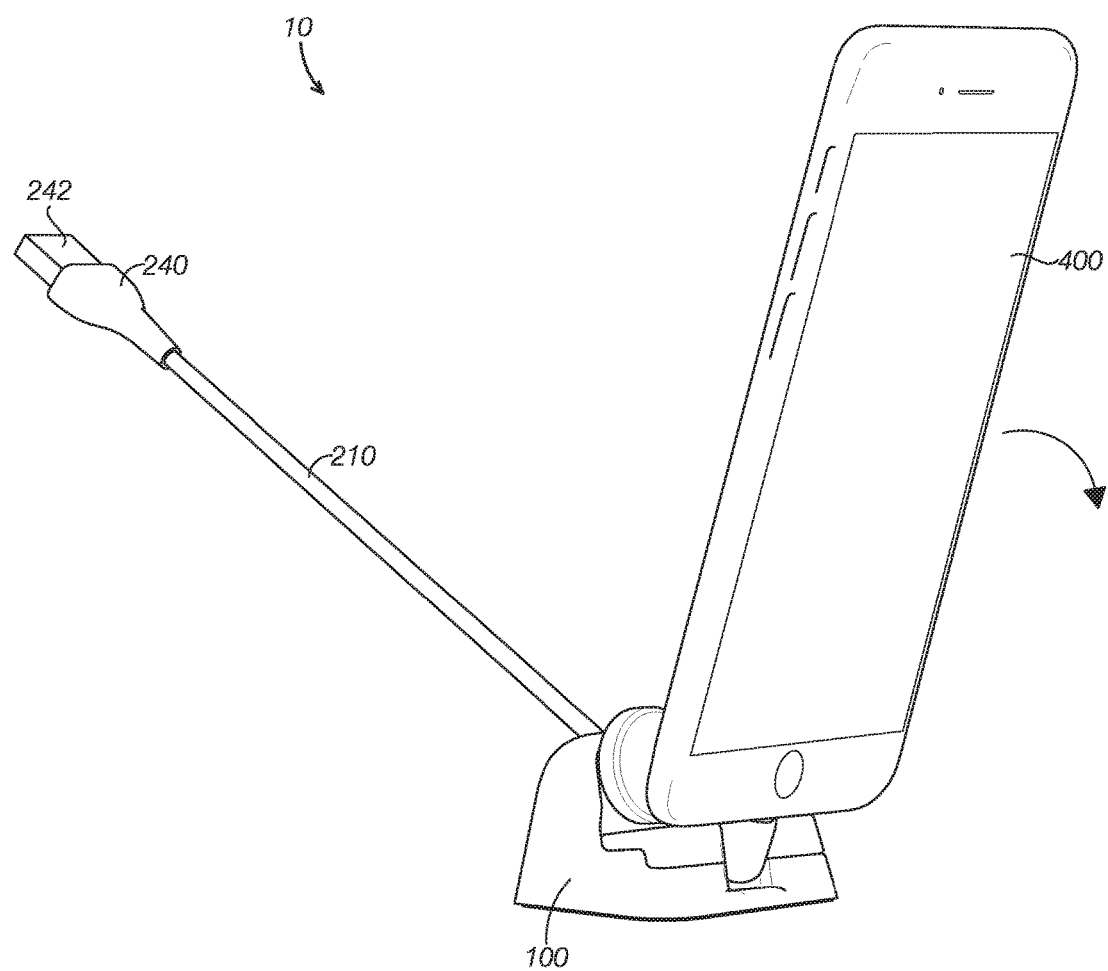
FIG. 4 is a perspective view of the docking station with the electronic device being rotated forward, as in FIG. 2.

As shown in FIGS. 2 and 4, electronic device 400, plugged into connector plug 270, may be rotated forward with one hand, such that connector head 250 pivots slightly via the pivot formed between releasable pivot mechanism 300 retained in the base and the first recess 220 of the connector head 250. As can be seen, in some embodiments, the pivot surface 257 may define a rockered surface to facilitate the forward rotation of the connector head 250.

Figure 5:
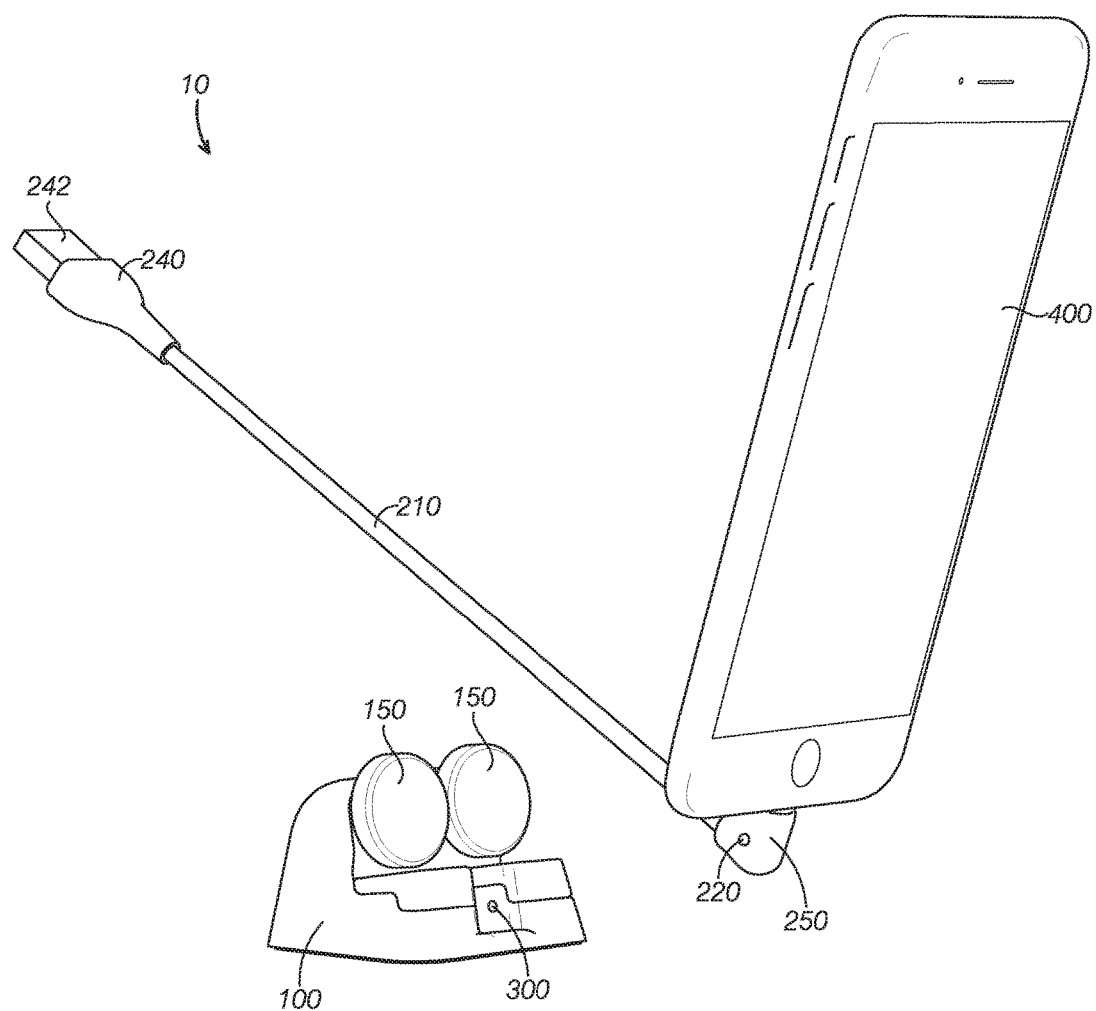
FIG. 5 is a perspective view of the docking station after the electronic device has been disengaged from the docking station via forward rotation, thus keeping the electronic device plugged into the charging connector cord.

The rotation of the connector head 250 may cause pivot surface 257 to press against fulcrum surface 160 thereby imparting an input leverage force on connector 250. This input leverage force may be sufficient to overcome the releasable pivot. Thus, in those embodiments comprising a detent the leverage force may overcome the releasable pivot by forcing the spring-loaded ball further into the first recess 220. In those embodiments comprising a mating pair of magnets, the leverage force may overcome the releasable pivot by forcing the magnets apart. Thus, the connector head 250 may be released from the base 100 while keeping the connector head attached to electronic device 400, as shown in FIG. 5.

Figure 6:
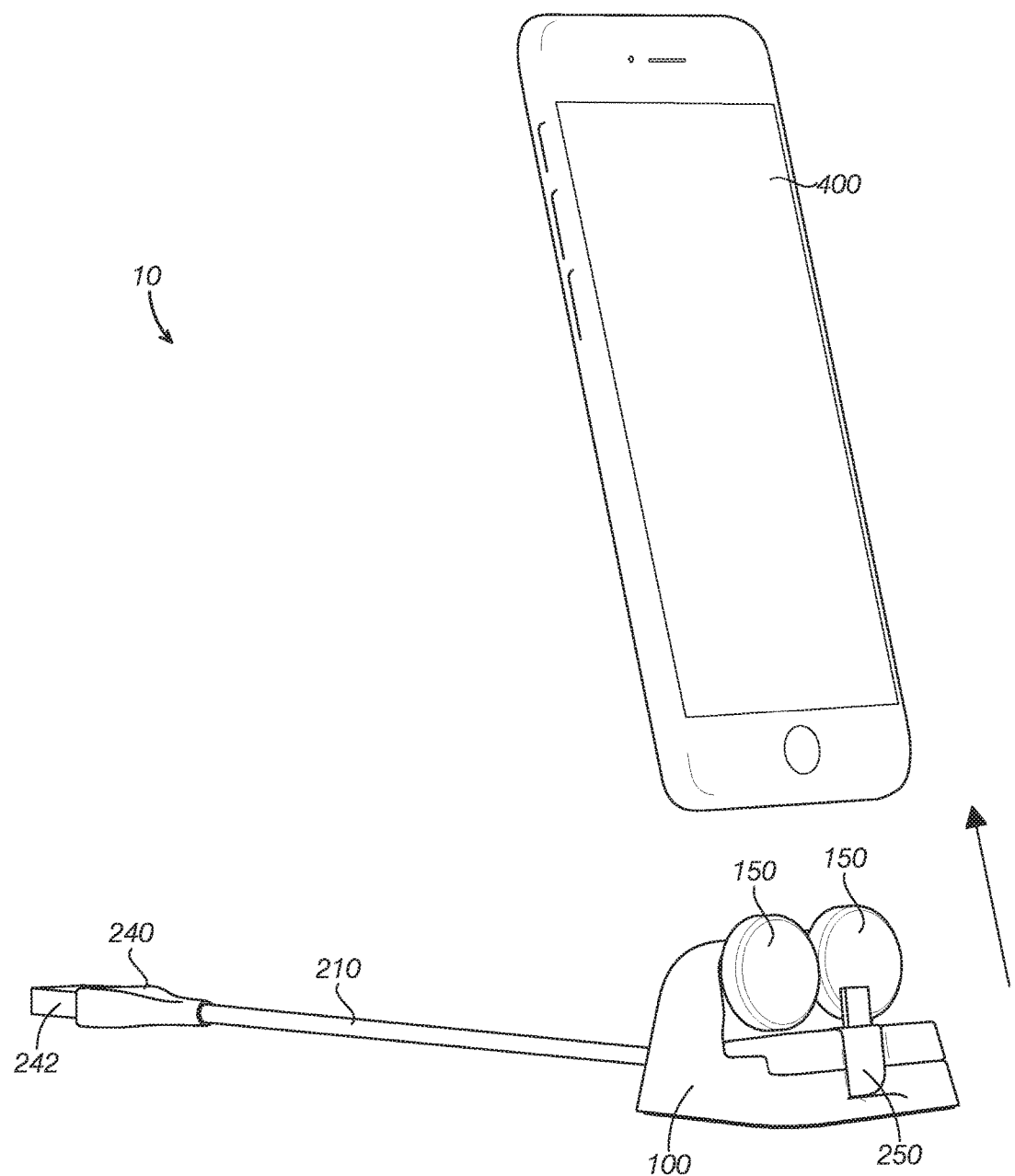
FIG. 6 is a perspective view of the docking station after the electronic device has been disengaged from the docking station via lifting upward, thus unplugging the electronic device from the charging connector cord.

As shown in FIG. 6, the detent mechanism 300 may secure the connector head 250 to the base 100 such that an upward force on electronic device that is sufficient to separate the electronic device from the connector plug is not sufficient to overcome the releasable pivot mechanism 300.

Thus, by simply rotating the electronic device 400 forward with one hand, a user may separate the connector head 250 from the base 100, while keeping the connector plug 270 plugged into the electronic device 400. By simply pulling up on the electronic device 400, the electronic device may be separated from the connector plug 270, while keeping the connector head 250 attached to the base 100.

In the illustrated embodiment the detent mechanism comprises a spring-loaded ball retained in the second recess 220 in the base. Thus, in the illustrated embodiment, the spring-loaded ball detent is an integral part of base 100. In other embodiments, the spring-loaded ball detent may be retained in a first recess of the connector head, and be configured to interface with a second recess in the base. In this regard, the spring-loaded ball detent may be an integral part of the connector head.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. An electronic device docking station comprising:
    a connector comprising:
        a connector head having a neck, a face, a first recess configured to interface with a releasable pivot mechanism, and a pivot surface;
        a connector plug extending from the face of the connector head, the plug being configured to connect to an electronic device;
        a flexible cable extending from the neck the connector head;
    a base comprising:
        a second recess configured to interface with the releasable pivot mechanism and thereby releasably secure the connector head to the base;
        a fulcrum surface configured to contact the pivot surface.

2. The electronic device docking station of claim 1, wherein the pivot surface of the connector head defines a rockered surface.

3. The electronic device docking station of claim 1, wherein the fulcrum surface is a flat surface.

4. The electronic device docking station of claim 1, wherein the releasable pivot mechanism comprises a spring-loaded ball detent.

5. The electronic device docking station of claim 1, wherein the releasable pivot mechanism comprises a mating pair of magnets, wherein a first magnet of the pair is disposed in the first recess and a second magnet of the pair is disposed in the second recess.

6. The electronic device docking station of claim 1, the base comprising a support configured to prop up the rear side of an electronic device.

7. The electronic device docking station of claim 6, wherein the support is an adjustable support.

8. The electronic device docking station of claim 7, wherein the support comprises two independent threaded members.

9. An electronic device docking station comprising:
    a connector comprising:
        a connector head having a neck, a face, a first recess configured to interface with a releasable pivot mechanism, and a pivot surface;
        a connector plug extending from the face of the connector head, the plug being configured to connect to an electronic device;
        a flexible cable extending from the neck the connector head;
    an electronic device plugged into the connector plug; and
    a base comprising:
        a second recess configured to interface with the releasable pivot mechanism and thereby releasably secure the connector head to the base such that the electronic device may be pulled off the connector plug without disengaging the connector head from the base;
        a fulcrum surface configured to contact the pivot surface of the connector head such that an input leverage force may be applied to the electronic device to pivot the connector head in the base and produce an output force suffice to overcome the releasable pivot mechanism.

10. The electronic device docking station of claim 9, wherein the pivot surface of the connector head defines a rockered surface.

11. The electronic device docking station of claim 9, wherein the fulcrum surface is a flat surface.

12. The electronic device docking station of claim 9, wherein the releasable pivot mechanism comprises a spring-loaded ball detent.

13. The electronic device docking station of claim 9, wherein the releasable pivot mechanism comprises a mating pair of magnets, wherein a first magnet of the pair is disposed in the first recess and a second magnet of the pair is disposed in the second recess.

14. The electronic device docking station of claim 9, the base comprising a support configured to prop up the rear side of an electronic device.

15. The electronic device docking station of claim 14, wherein the support is an adjustable support.

16. The electronic device docking station of claim 15, wherein the support comprises two independent threaded members.

* * * * *